United States Patent [19]

Callahan

[11] Patent Number: 5,424,551
[45] Date of Patent: Jun. 13, 1995

[54] FREQUENCY EMITTER FOR CONTROL OF INSECTS

[75] Inventor: Philip S. Callahan, Gainesville, Fla.

[73] Assignee: Richard J. Fox, Wayne, Pa.

[21] Appl. No.: 121,368

[22] Filed: Sep. 15, 1993

[51] Int. Cl.$^6$ .................................................. G02B 5/00
[52] U.S. Cl. ................................ 250/493.1; 250/503.1
[58] Field of Search ............. 250/493.1, 503.1, 504 R, 250/526, 338.1, 341

[56] References Cited

U.S. PATENT DOCUMENTS 3,997,785 12/1976 Callahan ............................. 250/338
4,982,100  1/1991 Harding ........................... 250/493.1

OTHER PUBLICATIONS

G. Mueller, "A Broadside Dielectric Antenna", Proceedings of the I.R.E., pp. 71–75, Jan. 1952.
P. Callahan, "Oviposition Response of the Imago of the Corn Earworm *Heliothis zea* (Boddie), to Various Wave Lengths of Light", Ann. of the Entom. Soc. of Am., vol. 50, No. 5, pp. 444–452, Sep. 1957.
P. Callahan, "Intermediate and Far Infrared Sending of Nocturnal Insects. Part II. The Compound Eye of the Corn Earworm, *Heliothis zea*, and Other Moths as a Mosaic Optic-Electromagnetic Thermal Radiometer", Ann. of the Entom. Soc. of Am., vol. 58, No. 5, pp. 746–756, Sep. 1965.
P. Callahan, "Insect Molecular Bioelectronics: A Theoretical and Experimental Study of Insect Sensilla as Tubular Waveguides, with Particular Emphasis on Their Dielectric and Thermoelectret Properties", Misc. Publ. of the Entom. Soc. of Am., vol. 5, No. 7, pp. 315–347, Jun. 1967.
I. Fabelinskii, Molecular Scattering of Light, Plenum Press, New York, pp. 1–17, 1968.
Mangum et al., "Attraction of Near-Infrared Radiation to *Aedes aegypti*", Journal of Economic Entomology, vol. 61, No. 1, pp. 36–37, Feb. 1968.
P. Callahan, "A High Frequency Dielectric Waveguide on the Antennae of Night-Flying Moths (Saturnidae)", Applied Optics, vol. 7, No. 8, pp. 1425–1430, Aug. 1968.
Slifkin et al., "A Simple Apparatus for Measuring the Absorption Spectrum and Lifetimes of Photo-Produced Short Lived Species Using Commercial Subunits", J. of Phy., E: Sci. Ins., vol. 3, 1970.
Webb et al., "Sixteen New Infrared Laser Dyes Excited by a Simple, Linear Flashlamp", Eastman Organic Chemical Bulletin, vol. 46, No. 3, pp. 1–7, 1974.
Robinson et al., "Studies on the Feasibility of the Determination of Sulfuric Acid Aerosol in Auto Exhaust Gases by Laser Induced Infrared Excitation", Env. Lett., vol. 7, No. 3, pp. 195–206, 1974.
P. Callahan, "Insect Antennae with Special Reference to the Mechanism of Scent Detection and the Evolution of the Sensilla", Int. J. Insect Morphol. & Embryol., vol. 4, No. 5, pp. 381–430, 1975.
Slifkin et al., "Modulation Excitation Spectrophotometry of Purple Membrane of *Halobacterium halobium*", Nature, vol. 253, pp. 56–58, Jan. 3, 1975.
Biondi et al., "Resonances in Atoms and Molecules", adaptation of papers presented at Gaseous Electronics Conference, Cleveland, 1976.
P. Brooks, "Reactions of Oriented Molecules", Science, vol. 193, No. 4247, pp. 11–16, Jul. 2, 1976.
P. Callahan, "Solid State Organic (Pheromone-Beeswax) Far Infrared Maser", Applied Optics, vol. 16, No. 6, pp. 1557–1562, Jun. 1977.

(List continued on next page.)

Primary Examiner—Jack I. Berman
Assistant Examiner—James Beyer
Attorney, Agent, or Firm—Sterne, Kessler, Goldstein & Fox

[57] ABSTRACT

The invention overcomes the problems with conventional solutions by utilizing natural (copied) scatter surfaces, dielectric spine (sensilla) forms, correct pumping radiations and correct vibratory modulating frequency to generate coherent or semi-coherent radiation frequencies to control or attract insects. Such control acting either as an attractant (e.g., for trapping) radiation or a frequency quenching (i.e., jamming) radiation for insects.

22 Claims, 8 Drawing Sheets

OTHER PUBLICATIONS

P. Callahan, "Moth and Candle: The Candle Flame as a Sexual Mimic of the Coded Infrared Wavelengths from a Moth Sex Scent (Pheromone)", *Applied Optics*, vol. 16, No. 12, pp. 3089–3097, Dec. 1977.

P. Callahan, "Tapping Modulation of the Far Infrared (17-μm Region) Emission from the Cabbage Looper Moth Pheromone (Sex Scent)", *Applied Optics*, vol. 16, No. 12, pp. 3098–3102, Dec. 1977.

P. Callahan, "Nonlinear Radiation and Life-The Human Breath as a Low Intensity Gasdynamic Laser", Proc. Intl. Conf. on Lasers, pp. 99–103, Dec. 11–15, 1978.

McNulty et al., "Fluorescent Scattering by Anisotropic Molecules Embedded in Small Particles", *Applied Optics*, vol. 18, No. 10, pp. 1484–1486, May 15, 1979.

"Surface-Enhanced Raman Effect", *Physics Today*, pp. 18–20, Apr. 1980.

J. Mort, "Conductive Polymers", *Science*, vol. 208, pp. 819–825, May 1980.

Rainwater et al., "Quasi-Optics: A Hybrid Technology for Near-Millimeter Waves", *Microwaves*, pp. 76–82, Jun. 1980.

Wang et al., "Enhanced Raman Scattering at the Surface (SERS) of a Spherical Particle", *Applied Optics*, vol. 19, No. 14, pp. 2256–2257, Jul. 1980.

P. Callahan, "Nonlinear IR Resonance in a Biological System", *Applied Optics*, vol. 20, No. 22, p. 3827, Nov. 15, 1981.

Wenke et al., "Comparison of Efficiency and Feedback Characteristics of Techniques for Coupling Semiconductor Lasers to Single-Mode Fiber", *Applied Optics*, vol. 22, No. 23, pp. 3837–3844, Dec. 1, 1983.

P. Callahan, "Nonlinear Maserlike Radiation in Biological Systems", *Insect Neurochemistry and Neurophysiology*, pp. 337–339, 1984.

H. Fritzsche, "Noncrystalline Semiconductors", *Physics Today*, pp. 34–41, Oct. 1984.

Callahan et al., "Mechanism of Attraction of the Lovebug, *Plecia nearctica*, to Southern Highways: Further Evidence for the IR-Dielectric Waveguide Theory of Insect Olfaction", *Applied Optics*, vol. 24, No. 8, pp. 1088–1093, Apr. 15, 1985.

P. Callahan, "Dielectric Waveguide Modeling at 3.0 cm of the Antenna Sensilla of the Lovebug, *Plecia neartica* Hardy", *Applied Optics*, vol. 24, No. 8, pp. 1094–1097, Apr. 15, 1985.

P. Callahan, "Maserlike Nonlinear Scatter from Human Breath, and Surface-Enhanced Far Infrared Scatter Effect", *Medical Hypotheses*, vol. 28, pp. 99–105, 1989.

P. Callahan, "Treating the AIDS Virus as an Antenna", *21st Century*, pp. 26–31, Mar.–Apr. 1989.

P. Callahan, "Nonlinear Infrared Coherent Radiation as an Energy Coupling Mechanism in Living Systems", *Molecular and Biological Physics of Living Systems*, pp. 239–273, 1990.

Mizrahi et al., "The Mystery of Frequency Doubling in Optical Fibers", *Optics & Photonics News*, pp. 16–20, Jan. 1991.

R. Ruff, "Array Detectors Increase Spectroradiometer Flexibility", *Laser Focus World*, pp. 155–158, Apr. 1991.

S. John, "Localization of Light", *Physics Today*, pp. 32–40, May 1991.

P. Callahan, "Dielectric Waveguide (Open Resonator) Models of the Corn Earworm, Sensilla: Sensilla Relationship to Infrared Coherent Molecular Scatter Emissions from Semiochemicals (Lepidoptera: Noctuidae)", *Ann. of the Entom. Soc. of Am.*, vol. 84, No. 4, pp. 361–368, Jul. 1991.

Jewell et al., "Microlasers", *Scientific American*, pp. 86–94, Nov. 1991.

Scherer et al., "Lasing in Sub-Micron Wide Vertical Cavity Microlasers", *Optics and Photonics News*, p. 9, Dec. 1991.

Grossman et al., "Lithographic Spiral Antennas at Short Wavelengths", *Appl. Phys. Lett.*, vol. 59, No. 25, pp. 3225–3227, Dec. 16, 1991.

FREQUENCY EMITTER FOR CONTROL OF INSECTS

BACKGROUND OF THE INVENTION

1. Field of the Invention

The invention relates generally to an apparatus and method for controlling or attracting insects and, more particularly, to an apparatus and method for emulating a natural scatter surface, a natural vibratory modulating frequency, and an associated pumping radiation to generate coherent or semi-coherent radiation frequencies to control or attract insects.

2. Discussion of Related Art

Insects such as fleas, mosquitos, moths, etc. are undesirable because they are bothersome, destroy property, and often pose health risks. Devices and methods for trapping, killing, and disposing of insects are well known in the art. These devices and methods have taken many forms and include, for example, fly paper, electric insect killers that kill by electrocution, and chemical pesticides. Conventional devices and methods have many shortcomings. For example, fly paper and electric insect killers are both ineffective at attracting insects, and as such, are only marginally effective (approximately 5–10%) for eliminating insects within a given area. Chemical pesticides are dangerous to both the human population and the environment as a whole. Further, chemical pesticides are also ineffective at attracting insects.

It has long been known that insects are attracted to specific molecules of sex and host plant attractants. For example, Dr. Philip S. Callahan (hereinafter Applicant) demonstrated conclusively in 1957 that night flying moths are not attracted to visible light but rather to the infrared scatter frequencies from scents of plants in the air stimulated by the visible light from a low intensity light source. Callahan, "Oviposition Response to the Imago of the Corn Earworm Heliothis Zea (Boddie), to Various Wave Lengths of Light," Annals of the Entomological Society of America, Vol. 50, No. 5, September 1957. A summary of scatter radiation can be found in Fabelinskii, Molecular Scattering of Light, translated by Robert T. Beyer, Department of Physics, Brown University, Plenum Press, New York, 1968.

In a series of articles in the mid 1960's, Applicant demonstrated that the antennae of insects act as photonic, open resonator waveguides to collect and transmit infrared frequencies. See Callahan, "A High Frequency Dielectric Waveguide on the Antenna of Night-Flying Moths (Saturnidae)," Applied Optics, Vol. 7, page 1425, August 1963; Callahan, "Intermediate and Far Infrared Sensing of Nocturnal Insects, Part II, The Compound Eye of the Corn Earworm, Heliothis zea, and Other Moths as a Mosaic Optic-electromagnetic Thermal Radiometer," Annals of the Entomological Society of America, Volume 58, Number 5, pp. 746–756, September 1965; and Callahan, "Insect Molecular Bioelectronics: A Theoretical and Experimental Study of Insect Sensillae as Tubular Waveguides, with Particular Emphasis on Their Dielectric and Thermoelectric Properties," Miscellaneous Publications of the Entomological Society of America, Volume 5, Number 7, page 315-347, June 1967.

In 1968, Applicant demonstrated the attractance of the mosquito Aedes aegypti to human vapor pumped by near infrared radiation in a totally dark environment. See Mangum et al., "Attractance of Near-Infrared Radiation to Aedes aegypti," Journal of Economic Entomology, Volume 61, Number 1, pp. 36–37, February 1968. This work with insect antennas is described in detail in Callahan, "Insect Antenna with Special Reference to the Mechanism of Scent Detection and the Evolution of the Sensilla, "Int. J. Insect Morphol. & Embryol, 4(5):381–430 (1975).

In 1977, Applicant demonstrated that attractance of night flying moths to candles is not due to the eye and light but instead due to the insect dielectric antenna and candle-water vapor infrared emissions to which the insects antenna is tuned. See Philip S. Callahan, "Moth and candle: the candle flame as a sexual mimic of the coded infrared wavelengths from a moth sex scent (pheromone)", Applied Optics, Vol. 16, page 3089, December 1977, and Philip S. Callahan, "Trapping modulation of the far infrared (17-$\mu$m region) emission from the cabbage looper moth pheromone (sex cent)," Applied Optics, Vol 16, page 3098, December 1977.

For certain insect species, specific attractants (such as "pheromones," which are insect produced volatile compounds) have been chemically identified and synthesized. The isolation of sex and host plant attractant molecules has progressed steadily over the past few decades. Attractants have been utilized in various conventional traps but with poor results since these traps dissipate all of their (pheromone) scent in the air and in only a few days are useless.

In U.S. Pat. No. 3,997,785 to Callahan, which is incorporated by reference herein, Applicant described a system for vibrating a gold coated needle in a molecular scent vapor contained in an enclosed chamber in order to stimulate and emit narrow band maser-like energy from an infrared transmitting window for control of insects. This system, although providing advantages over other conventional solutions, was frequently ineffective because it failed to produce maser-like frequencies that closely mimicked the frequencies produced by the insect being controlled.

There is therefore a need for a device and method that can attract and/or control insects within a specified region, is harmless to the human population, and is relatively inexpensive and easy to operate.

SUMMARY OF THE INVENTION

The invention overcomes the problems with conventional solutions by utilizing natural (copied) scatter surfaces, natural vibratory modulating frequency, and associated pumping radiation to generate coherent or semi-coherent radiation frequencies to control or attract insects. Thus, the present invention applies to the control of all insects in nature; such control acting either as an attractant radiation (e.g., for trapping) or a frequency quenching (i.e., jamming) radiation for insects.

The present invention provides a method and apparatus for emitting natural millimeter, infrared, visual, UV or UV-X-ray frequencies for control of insects. Control may involve attracting the insects or repelling them. Attractance is achieved by emitting attractance frequencies of the insect to be controlled. Repulsion is achieved by emitting quenching (or jamming) frequencies timed to the photon communication system of the insect, or by emitting out of phase frequencies that interfere with the molecular communication systems of the insect.

These many functions and frequencies are realized with the use of a specially designed frequency (wavelength) emitter which utilizes the natural semiochemicals of a particular insect, and the dielectric scatter surface of the particular insect, to mimic the coded wavelength utilized by the insect in its day to day reproductive and food searching behavior.

The semiochemical or other behavioral molecules are confined in a closed chamber with a window that allows coherent or semi-coherent maser-like radiation frequencies to be emitted. In the center of the chamber is a plate having an etched scatter surface copied from the antenna, thorax, wing or leg of the insect. The plate with the scatter surface is mounted perpendicular to the edge of the window within the chamber. An adjustable grating is also provided to focus the maser-like radiation frequencies for emission through the window. The adjustable grating has a predetermined number of grooves to match the antenna dimensions (dielectric waveguide open resonator) of the appropriate insect. The scatter surface is at a right angle to the adjustable grating and mounted on a vibrating rod with a control to allow the scatter surface to be vibrated in the extremely low frequency range (i.e., between 1 Hz and 800 Hz depending on the insect). The semiochemicals are circulated over the vibrating scatter surface creating coherent or semi-coherent narrow band high intensity maser-like emissions that are emitted to the environment through the window. The coherent or semi-coherent maser-like emissions are used to control, attract, or jam the natural frequencies of insects.

BRIEF DESCRIPTION OF THE FIGURES

The foregoing and other features and advantages of the invention will be apparent from the following and more particular description of the preferred embodiment of the invention, as illustrated in the accompanying Figures, in which:

FIG. 2(a) through 2(f) are photographs showing examples of various scatter surfaces found on the antenna, thorax, and legs of insects;

DETAILED DESCRIPTION OF PREFERRED EMBODIMENTS

1. Operational Overview

Figure 1:
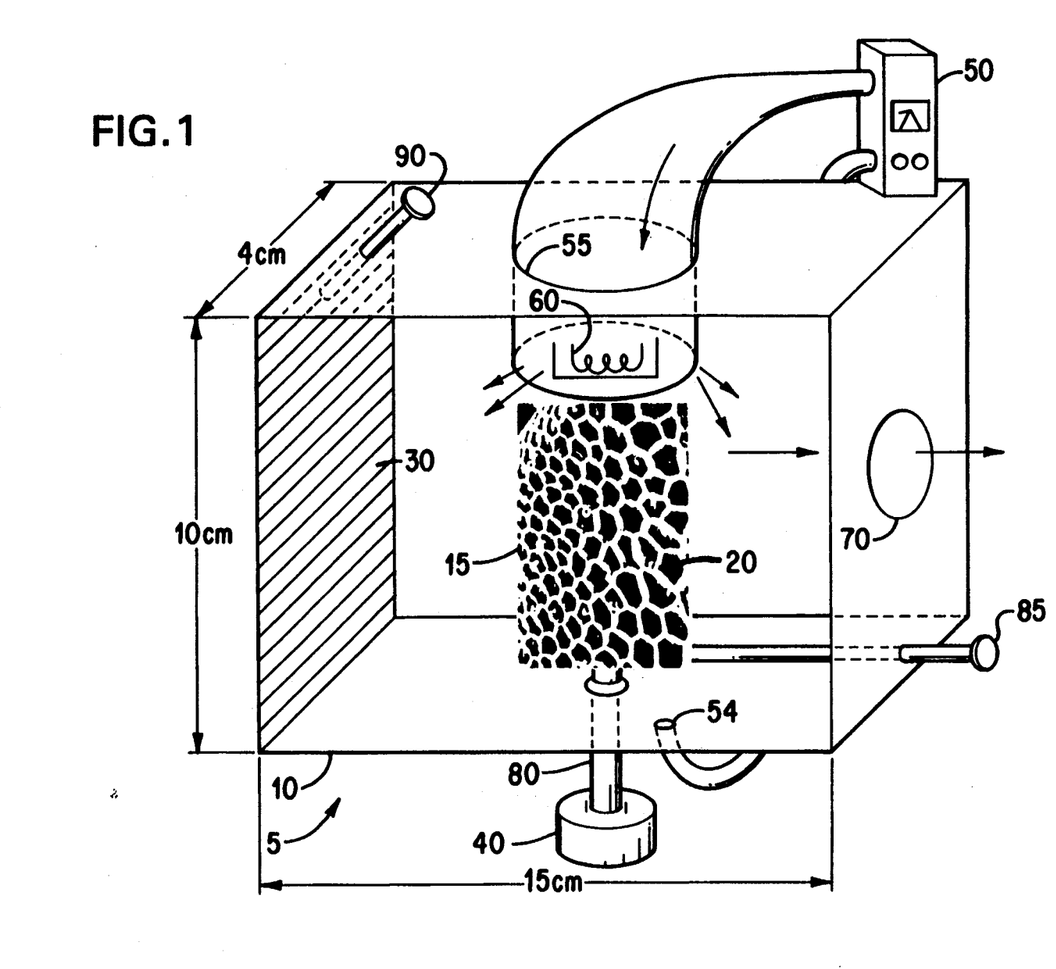
FIG. 1 is an illustration of a preferred embodiment of a coherent scatter and group wave soliton waveguide, surface enhanced emitter constructed in accordance with the present invention.

FIG. 1 illustrates a preferred embodiment of the present invention. The present invention comprises a frequency emitter 5 which provides a coherent scatter and group soliton waveguide, surface enhanced emitter for control of insects. This is accomplished by emitting attractance frequencies or conversely by emitting quenching (jamming) frequencies timed to the photon communication system of the insect. These functions are carried out by frequency emitter 5 which utilizes natural semiochemicals of a particular insect and the insect is natural dielectric scatter surface to mimic the coded wavelength utilized by the insect in its day to day reproductive and food searching behavior.

In this document, the term "semiochemicals" is taken to mean any molecule from an insect which naturally emits communication photons. The term "control" is taken to mean the attractance of an insect to a confined area where it can be eliminated (e.g., by electrocution or insecticides) or the repulsion of the insect away from a specified geographic area.

Frequency emitter 5 comprises a chamber 10, a scatter surface 20, an adjustable grating 30, a vibrator/rotor motor 40, an air pump 50, a light pump 60, and an infrared window 70. A functional and operational description of these components is given below. In brief, the frequency emitter 5 generates narrow band high intensity maser-like emissions from semiochemicals contained within chamber 10. The semiochemicals are circulated through the chamber over the scatter surface 20. The pump flow rate (i.e., the rate the semiochemicals are circulated (in a closed system) over scatter surface 20) is set to match wind speeds that stimulate insects to search and respond to the semiochemicals. Scatter surface 20 is vibrated at an appropriate modulation frequency (typically in the extremely low frequency range). By circulating the semiochemicals over vibrating scatter surface 20, maser-like emissions that emulate the natural frequencies generated by an insect can be generated and emitted through window 70 into the environment.

2. Structural Description of the Present Invention

Referring again to FIG. 1, chamber 10 can be any shape, such as a cube, globe, or a parabolic structure. However, the preferred embodiment is a cube measuring approximately 4 cm by 10 cm by 15 cm. In the preferred embodiment, chamber 10 is constructed of metal, plastic, or glass. However, any solid material can be used to construct the chamber 10. Chamber 10 has two holes 54, 55 formed on opposing sides for in and out air flow, respectively.

Chamber 10 is filled with semiochemical molecules or other behavioral molecules, such as pheromones or host plant scent molecules. Chamber 10 is sealed so that the semiochemical (i.e., attractant or quenching) molecules or other behavioral (e.g., scent) molecules can be circulated in a continuous fashion across scatter surface 20. In other words, the frequency emitter 5 is a closed system.

Placed in the center of the chamber 10 is a plate 15 having a scatter surface 20 etched therein. Plate 15 is made from metal or plastic. A micrometer tilt mechanism 85 is provided for adjusting the position of the scatter surface 20 in order to focus or fine tune the narrow band high intensity maser-like emissions (produced by circulating the natural semiochemicals across the natural scatter surface) through the window 70. In a preferred embodiment, scatter surface 20 is adjustable in all directions (e.g., vertically, horizontally, rotationally, pivotally, etc.).

The scatter surface is modeled, for example, after the antenna, thorax, wing or leg scatter surfaces found on all species of insects.

Present day etching technology has reached a state where micrometer dielectric or metal coated forms can be fabricated as scatter surfaces and amplifiers for short wave radiation in the millimeter, microwave, infrared (IR), visible and ultra violet (UV) region of the spectrum. Such miniature open resonator dielectric amplifiers or surface enhanced scatter configurations are now being produced and are described in Jewell et al., "Microlasers," Scientific America, November 1991, Scherer et al., "Lasing in Submicron Wide Vertical Cavity Microlasers," Optics and Photonics News, December 1991, Grossman et al., "Lithographic spiral antennas at short wavelengths," Appl. Phy. Lett., Vol 59, No. 25, December 1991, and John, "Localization of Light," Physics Today, May 1991, which are all incorporated by reference herein in their entirety.

Modern solid state physics is beginning to demonstrate enhanced sensitivity and high amplification of frequencies utilizing array "dots". Such dots are microscopic scatter three dimensional antenna arrays fabricated and etched by holographic lithography onto transistor surfaces. Such etching leaves 3-dimensional landscapes that "trap" and amplify frequencies. See Heitmann et al., "The Spectroscopy of Quantum Arrays," Physics Today, June 1993. Insects, for example, have been using such 3-dimensional surfaces for frequency amplification for millions of years.

The technique of atom-probe ion microscopy demonstrates that the imaging of gas atoms that lie above the surface atoms and occupy the more protruding sites are analogous to scatter surfaces of organisms. Such a surface has a rough texture with many tiny projections, or asperities. A rough surface is not good for imaging, however, unless it is designed with special edges or grooves (such as on an insect) to "focus" the atomic energies. Insects do not have rough surfaces but designed surfaces that enhance frequencies by oscillating surface segregation. Photographs of ions taken with a field ion microscope show soliton target waves in gases such as helium. Such soliton target waves are common at low energies from the atmosphere. See Tien Tsong, "Atom-Probe Field Ion Microscopy," Physics Today, May 1993. A soliton wave is a varying wave riding another wave.

Typical types of scatter surfaces for insects are listed in Table 1. FIGS. 2(a) through 2(f) are photographs showing examples of some of the scatter surfaces listed in Table 1.

TABLE 1

Table of Natural Surfaces 1. reticulated (springtails)
2. grooved or ridged (june beetles)
3. brush form (house flies)
4. ridged, cone form (cabbage looper moth)
5. circular group, peg form (aphids (*Myxuces persicae*))
6. saw tooth form (with motch (Erebrus))
7. comb peg form (honeybee)
8. multiple spike form (bird grasshopper)
9. rock crystal form (scale insects)
10. leaf shaped spike form (mosquitoes)
11. knobbed (aphids (*Myzus persicae*))
12. corn ear surface (tiger moth)
13. small knobbed surface (corn earworm moth)
14. large knobbed surface (Diptera sp.)
15. reticulated knobbed surface (Diptera sp.)
16. air scoop surface (fall armyworm moth)
17. vibrating hair surface (soldier fly)
18. helical corrugated surface (cabbage looper moth)
19. pine cone surface (*Neochetina eichoriniae*)
20. shingled (Brucifidae sp.)
21. ridged uplifted shingled (Hydrophychidae sp.)
22. irregular reticulated (sprintails)
23. pit and hill form (ants)

TABLE 1-continued

Table of Natural Surfaces 24. elongated reticulated (springtails)
25. loops (Hessian fly)

Figure 2A:
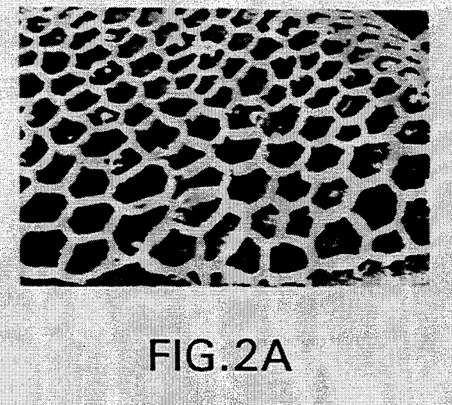
Figure 2B:
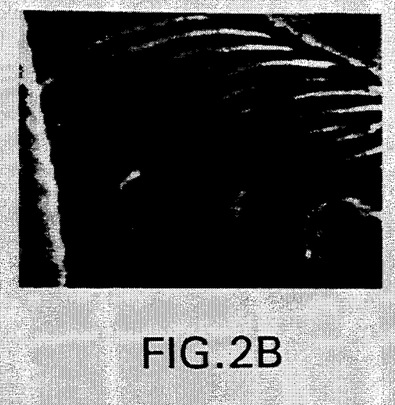
Figure 2C:
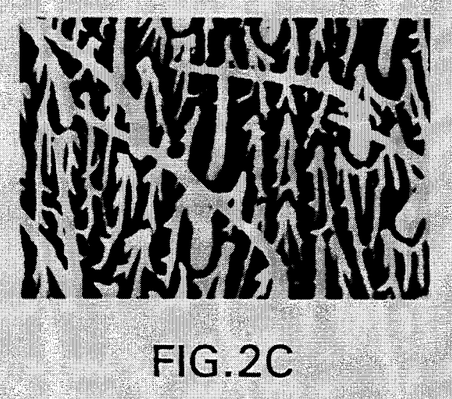
Figure 2D:
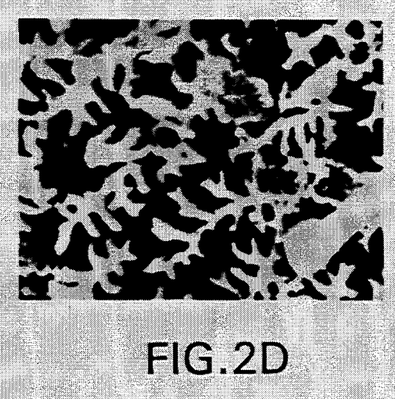
Figure 2E:
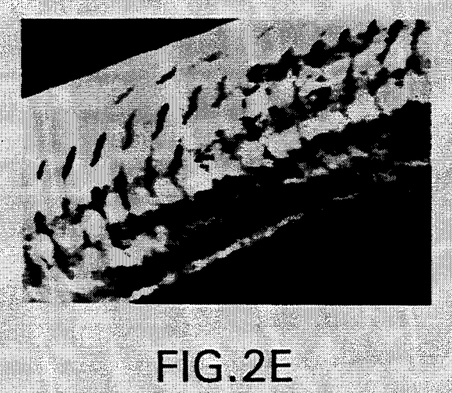
Figure 2F:
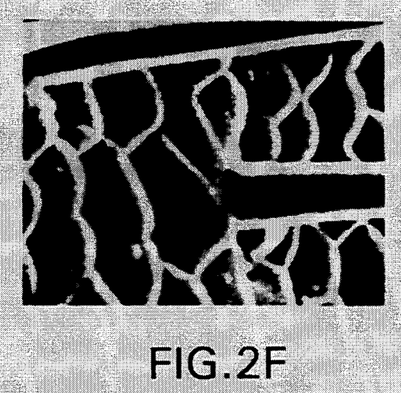
Figure 3:
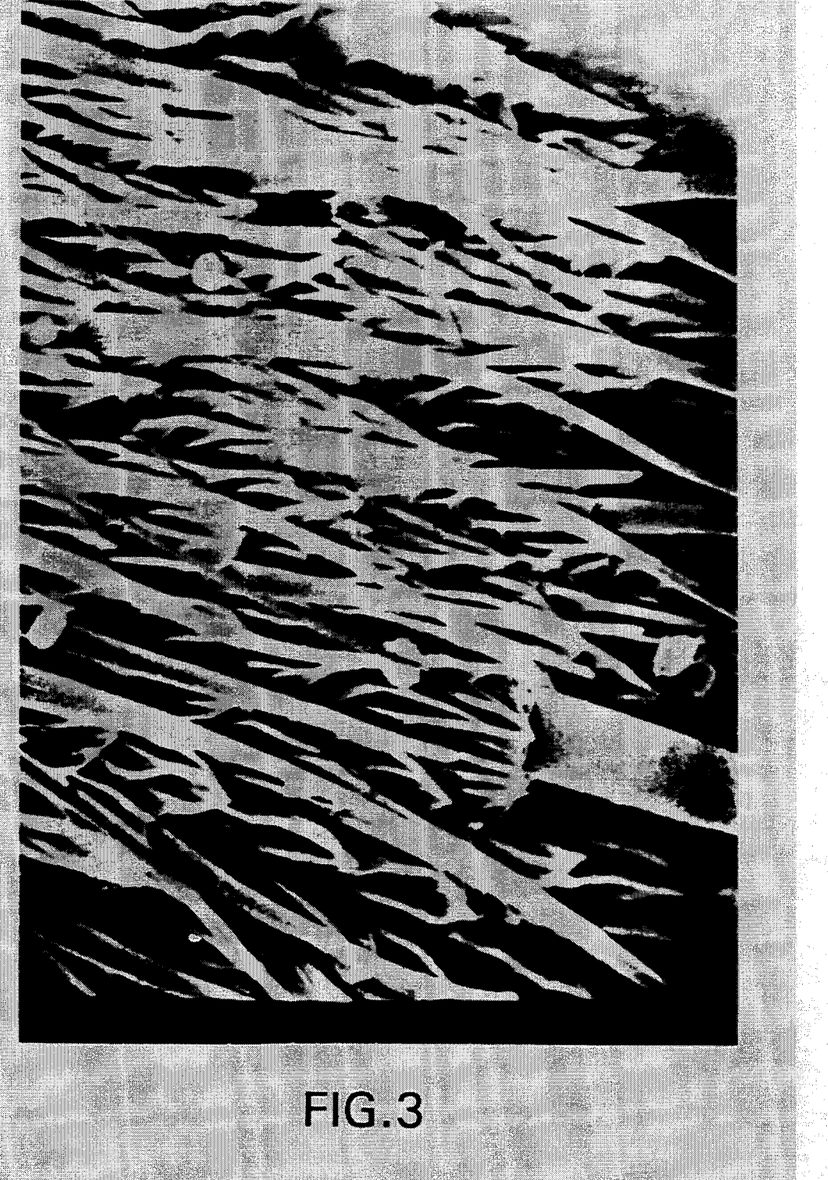
FIG. 3 is an example of the scatter surface of the antenna of the cabbage looper moth *Trichoplusia ni;*
Figure 4:
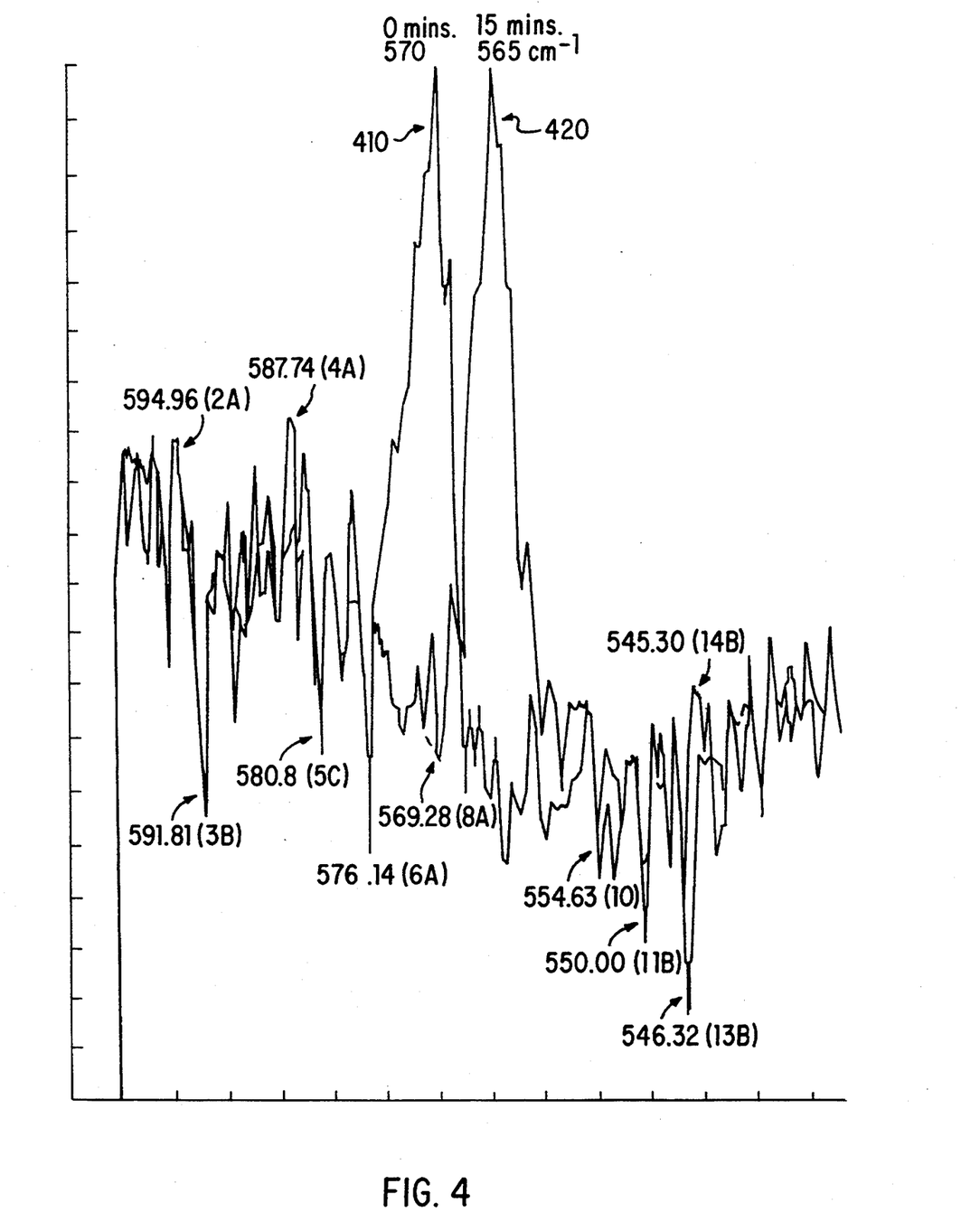
FIG. 4 is a spectrum of the cabbage looper moth (*Trichoplusia ni*) pheromone.
Figure 5:
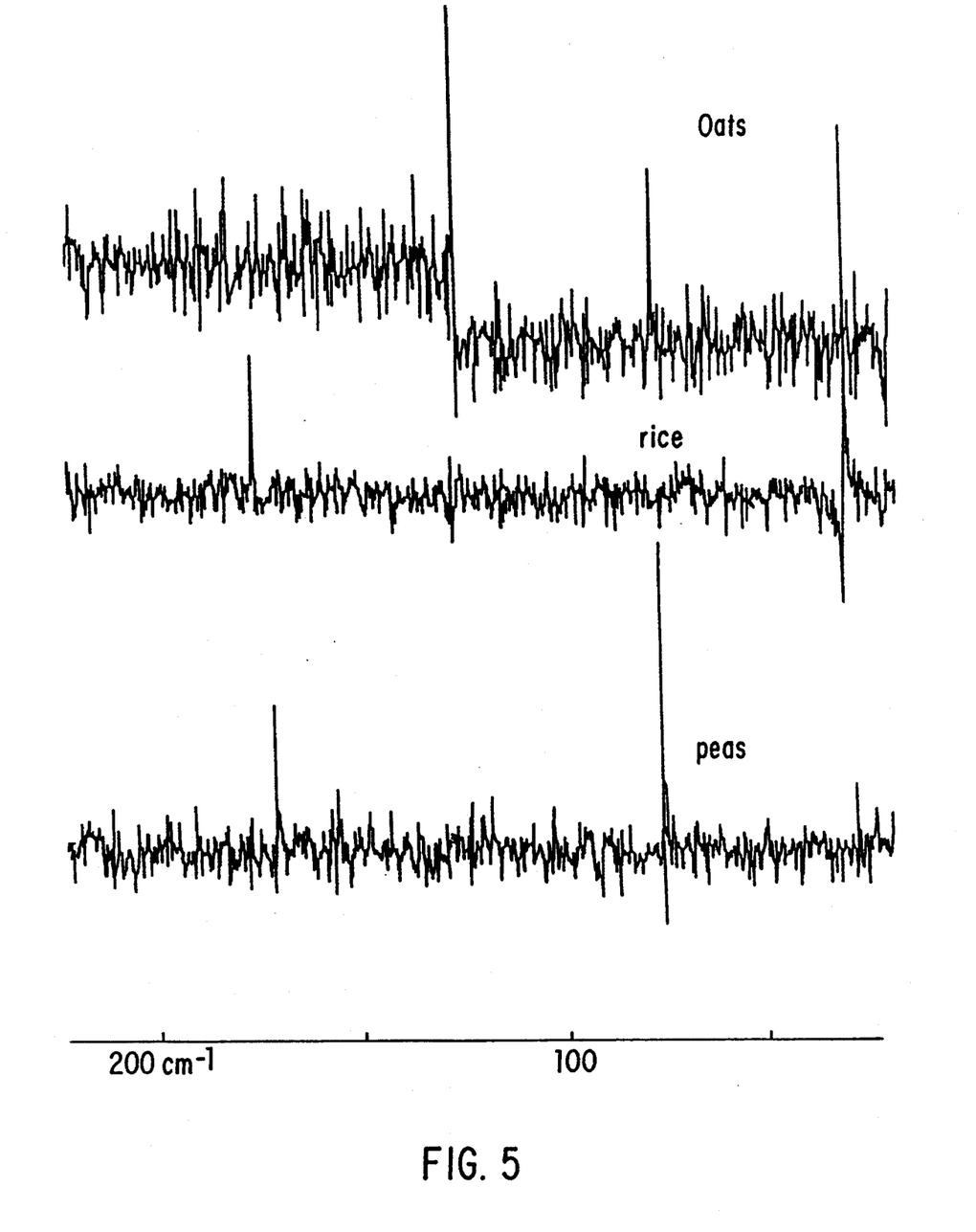
FIG. 5 illustrates a spectrum scattered off the surface of oats, rice and peas in a small container with their surfaces orientated so that the spectrophotometer beam is illuminated on a flat plane of the outer surfaces of the seeds.

FIG. 2(A) shows a reticulated surface (#1, Table 1). FIG. 2(B) shows a grooved or ridged (corrugated) surface (#2, Table 1). FIG. 2(C) shows a ridged, cone form surface as found in the cabbage looper moth (#4, Table 1). FIG. 2(D) shows a leaf shaped spike form surface (#10, Table 1). FIG. 2(E) shows a corn ear surface (#12, Table 1). FIG. 2(F) shows a shingled surface (#20, Table 1). All of these surfaces can be etched into plate 20 using present day micro-etching technology.

The airtight chamber 10 has a special millimeter, infrared, visible, ultra violet, or X-ray window 70 formed therein. Window 70 is used for emission of the scatter coherent radiation (i.e., maser-like emissions) generated by circulating semiochemicals across scatter surface 20 and grating 30 (described below). In a preferred embodiment window 70 is constructed using a Krs 5 infrared window.

The adjustable grating 30 is constructed with the proper number of grooves to generally match the natural dimension of the dielectric scatter antenna or sensilla (spines) of the organism being controlled. The adjustable grating should be gold plated for high reflectance in the visible and infrared region of the light spectrum. For example, the adjustable grating 30 is constructed with 20 groves/mm for cockroaches, 300–600 grooves/mm for small ticks or white flies. A list of typical grating dimensions for different insects, protozoan and bacteria are shown in TABLE 2.

TABLE 2

| SPECIFICATIONS WITH AVAILABLE GRATINGS | Cockroach | Moth | Mosquito | Tick | White Fly | Gnat |
|---|---|---|---|---|---|---|
| Grating (grooves/mm) | 20 | 75 | 150 | 300 | 600 | 1200 |
| Wavelength Operating Range | | | | | | |
| from: | 185 nm | 185 nm | 185 nm | 185 nm | 185 nm | 185 nm |
| to: | 72 μm | 19.2 μm | 9.6 μm | 4.8 μm | 2.4 μm | 1.2 μm |

Adjustable grating 30 is positioned on the side of chamber 10 opposite to window 70. A micrometer tilt mechanism 90 is provided for adjusting the position of grating 30 in order to focus or fine tune the narrow band high intensity maserlike emission through window 70.

In a preferred embodiment of the present invention, the positions of both scatter surface 20 and grating 30 are adjustable (e.g., sideways and up and down) so that they can be positioned to stimulate (and/or focus) natural maser-like emissions. The maser-like emissions are reflected from scatter surface 20 to grating 30. The maser-like emissions are then in turn reflected through window 70. These coherent or semi-coherent maser-like emissions are used to control a specific type of insect in the environment outside frequency emitter 5.

Note, that in a preferred embodiment, after the micrometer adjustments have been made to scatter surface 20 and grating 30 to correspond to a particular insect (e.g. cabbage looper moth), these adjustments can be permanently fixed. Thus, frequency emitter 5 with the semiochemicals contained within (e.g., Z-7-dodecene-1-ol acetate pheromone for the cabbage looper moth) can be placed on site without any further adjustments necessary.

The etched scatter surface 20 is mounted on a vibrating rod 80 perpendicular to the edge of window 70 and at a right angle to grating 30. Vibrating rod 80 is connected to a vibrator/rotor motor 40. Vibrating rod 80 is designed to allow the scatter surface tilt rod 85 to be positioned to screw forward and press against the plate 15. This configuration assures that small angle variations can be made in the surface alignment of scatter surface 20 in relation to grating 30. Once again, grating 30 can also been adjusted using the micrometer tilt mechanism 90.

Vibrator/rotor motor 50 comprises two elements: A low frequency oscillator and a rotor motor (described below). The low frequency oscillator can be controlled to vibrate rod 80 between 1 Hz and 800 Hz (depending on the insect being controlled). Table 3 gives a list of frequency ranges that may be used to control specific insect groups.

TABLE 3

| Insect Group | Frequency Range in cyles per second (CPS) |
|---|---|
| Saturnid moths (*Saturniidae*) | 8–16 |
| Butterflies (*Rhopalocera*) | 8–21 |
| Ants (*Formicoidea*) | 12–20 |
| Dragonflies (*Anisoptera*) | 20–28 |
| Sphingid moths (*Sphingidae*) | 26–45 |
| Noctuid moths (*Noctuidae*) | 35–55 |
| Crane flies (*Tipulidae*) | 44–73 |
| Lady beetles (*Coccinellaidae*) | 80–85 |
| Horse flies (*Tabanidae*) | 96–100 |
| Yellow jackets (*Vespidae*) | 110–115 |
| March flies (*Bibionidae*) | 126–140 |
| Bumble bees (*Apinae*) | 130–140 |
| Fruit flies (*Tephritidae*) | 150–250 |
| Honey bees (*Apinae*) | 185–190 |
| Mosquitoes (*Culicidae*) | 160–500 |

Air circulating pump 50 is provided to allow the semiochemical or other attractant or quenching molecules to be circulated across the vibrating scatter surface. Note that the chamber 10 is initially filled with the semiochemical or other attractant or quenching molecules before turning on the air circulating pump 50. The air flow is adjusted so that it mimics the air flow to which insects respond. That is, semiochemicals blowing at certain speeds through the air stimulate insects to search and respond to the chemicals. Thus, the semiochemical molecular flow is adjusted to match the natural air flow of airborne molecules that stimulate insects. In a preferred embodiment, the air flows from the top edge of scatter surface 20 to air pump 50 via opening 55, and is returned to chamber 10 through opening 54.

A light pump 60 is mounted directly above scatter surface 20. Light pump 60 can be any infrared, blue, ultra violet or UV-X-ray light source. An ultra violet (3600 Å) light source is used in a preferred embodiment. Light pump 60 allows low intensity pumping radiation (DC) to be directed across scatter surface 20. Light pump 60 can be constructed in a number of different ways, such as: (1) DC filament source placed behind a filter (e.g., a color filter, infrared filter, UV filter etc.); (2) a light emitting diode of proper frequency (e.g., millimeter, infrared, light, UV or UV-X-ray); (3) a flickering light source (1 to 800 or more Hz) in which case the scatter surface 20 can be adjusted to synchronize with the flicker of the light pump 60; or (4) an etched grating light source which reflects a defined frequency from its surface and across scatter surface 20.

If the present invention is used to control insects in a large area, yard, field etc., frequency emitter 5 can be rotated 360° around a vertical axis using vibrator/rotor motor 40. This allows frequency emitter 5 to sweep the emitted radiation from window 70 across the large area. The rotation is accomplished simultaneously with the vibration. Given this configuration, the present invention is particularly adaptable to be used in a storage grain elevator, for example. Note that the frequency emitter 5 does not need a rotor motor to operate correctly. To operate correctly only a low frequency oscillator is required.

3. Tuning the Frequency Emitter 5

Described below are a number of physical-chemical parameters involved in tuning frequency emitter 5 for a particular insect (e.g., cabbage looper moth). In order for the frequency emitter 5 to operate effectively one or more of these parameters may be involved. For example, the wrong temperature or the wrong concentration of the semiochemical may shift the emission out of "tune" diminishing the benefits of the present invention.

Temperature affects the wavelength of the maser-like emissions emitted from frequency emitter 5. As such, changing the temperature within the frequency emitter 5 can increase or decrease the performance of the present invention. Generally, the frequency emitter should be operated between 30 to 120 F. Higher temperatures produce longer wavelengths and lower temperatures produce shorter wavelengths in the maser-like emissions.

A higher concentration of semiochemicals produces longer wavelengths and a lower concentration of semiochemicals produces shorter wavelengths in the maser-like emissions.

Modulating the scatter surface at different frequencies can change the harmonics of the maser-like emissions. A higher modulating frequency results in the harmonics being farther apart, while a lower modulating frequency results in the harmonics being closer together.

Experiments in the field have demonstrated that semiochemicals blowing at certain speeds through the air stimulate insects to search and respond to the chemicals. If the velocity (measured in miles per hour (MPH)) is too low or too high the molecules do not collide and vibrate with the insects scatter surface at the frequency to which the insect naturally responds. The efficiency of frequency emitter 5 can therefore be increased by changing the flowrate that the semiochemicals are circulated through chamber 10. Experiments have shown that efficiency has increased by changing the flowrate from 0.1 to 0.8 MPH.

Insects fly at different times of night and day. Since the environmental radiation (pumping radiation) often changes due to overcast or haze etc., the color and intensity of light may change from good to bad or vice versa. By changing the wavelength of the pumping radiation (i.e., changing the type of light pump 60) the amplitude of the maser-like emissions can also be altered to correspond to a particular insect.

It is important that the circulating molecules be of the correct degree of freedom (i.e., not to close together or to far apart) to assure coherent emission at vibrating scatter surface 20. The emissions should be directed at a right angle against grating 30 and reflected out of window 70. Nitrogen may be added to the molecular semiochemical (by experimentation) in order to provide a carrier for the emitting molecules and to obtain the correct degrees of freedom in the diluted vapor.

As seen from above, fine tuning the frequency emitter 5 can be a challenging process which includes experimentation within the natural environment of the insect. Along with the above techniques, Table 4 provides a number of other factors that should be considered when operating the present invention.

TABLE 4

| | |
|---|---|
| 1. | Efficiency can be increased by applying an electret effect (plus and minus charge). The electret effect can be obtained from a purchased teflon electret, or made by placing a teflon sheet between two plates at 2000 volts and slightly heating the sheet. An electret effect orients molecules. If the molecules form a single layer it is referred to as a "monolayer effect." |
| 3. | Semiochemical concentration increase can broaden the frequency line. |
| 4. | Adding $(CH)_{2n}$ in the semiochemical chain can produce a shift in the frequency line. |
| 5. | Frequency emissions not only occur in large windows (2, 5, 7, to 14 Um), but also in micro (e.g., narrow) windows between the water rotation absorption bands. However, the frequency emissions will be quenched if they coincide with the water rotation absorption bands. |
| 6. | Doping by adding extra $(CH)_{2n}$ or $(CH)_{3n}$ shift or quenches frequencies. |
| 7. | Doping with minute amounts of ammonia $(NH)_3$ can increase efficiency (i.e., the ammonia acts as a catalytic agent). |
| 8. | Medium to weak primary wavelength sidebands are typically associated with strong emissions. Adjusting the wavelength of the sidebands can oftentimes produce better results. For example, an insect might be more inclined to be tuned into the stronger wavelengths of the sidebands. |

The teachings of the present invention can also be extended to a photonic waveguide integrated diode circuit having etched scatter surface contained therein. The diode can be used to control insects since present day technology makes it feasible to reduce this entire scatter biological control chamber to a single emitting diode.

4. Examples

As shown in FIGS. 11 through 14, emissions from insect semiochemicals (pheromone, plant seed, formaldehyde and $CO_2$, respectively) can be stimulated to emit narrow band maser-like signature frequencies by blowing them across a natural scatter surface. These semiochemicals are modulated with the same frequencies that the insect vibrates its antenna, as shown in Table 3. Given below are a few examples of the type of insects that can be controlled with the present invention.

a. *Trichoplusia ni*

FIG. 3 is an example of the scatter surface of the antenna of the cabbage looper moth *Trichoplusia ni*. The sensilla (pheromone sensors) dielectric waveguide spines can be seen protruding between the ridged cones of the scatter surface. The dielectric waveguide sensilla (spines) themselves have corrugated scatter surfaces. To control the cabbage looper moth, scatter surface 20 would be modeled after this surface.

FIG. 4 is a spectrum of the cabbage looper moth pheromone Z-7-dodecene-1-ol acetate. Chamber 10 is filled with this semiochemical molecule and pumped by blue light via light pump 60. Since 55 Hz is the antenna vibration frequency of the cabbage looper moth, scatter surface 20 located within chamber 10 is vibrated at this frequency. A 17 μm water vapor microwindow is used. Water vapor (e.g., 2A, 3B, 4A, 5C, etc.) and pheromone emission lines 410 and 420 are designated. Pheromone emissions 410 and 420 frequencies shift from 570 μm to 565 μm over a 15 minute period, respectively, due to deliberate heating in chamber 10 (i.e., temperature tuning). Concentration tuning is also evident by changing the amount of the pheromone.

b. *Plodia interpunctella*

The Indian Meal moth (*Plodia interpunctella*) destroys millions of dollars of stored grain each year all over the world. Typically grains include oats, rice, and peas. FIG. 5 is a spectrum scattered off the surface of the seeds of oats, rice and peas in a small container with their surfaces orientated so that a spectrophotometer beam illuminated the flat plane of the outer surfaces of the seeds. The scent outgassing from the surface of each group of plant seeds shows a group of narrowband coded emissions (like a bar code). These nonlinear maser-like emissions represent acoustic Stokes Brillioin and Raman scatter from the outgassing plant scents. In order to control the Indian Meal moth, chamber 10 is filled with one of the semiochemicals shown in FIG. 5.

Scatter surface 20 is modeled after the antenna surface of the Indian Meal moth (shown in FIG. 2F), and modulated at 30 Hz (i.e., the modulation frequency of the antenna of the Indian Meal Moth) to produce narrow band maser-like emissions. These emissions emitted through window 70 can be used to control (and consequently eliminate within a given area) the Indian Meal moth.

c. *Plecice nearctia*

FIG. 6 is a spectrum of formaldehyde flowing across a 3600 Å Blacklight UV bulb. Formaldehyde is a powerful attractant to the Love bug (*Plecice nearctia*), a nuisance insect that is attracted to highways by the aldehydes in exhaust fumes.

Spectrum A is a scan with the formaldehyde modulated at 130 Hz (i.e., the antenna vibration frequency of the lovebug antenna). Spectrum B is formaldehyde also modulated at 130 Hz but with the vapor blowing at high speed (10 mph) across the interferometer infrared beam. The pumping radiation is still 3600 Å UV. The Rayleigh center scatter line which is narrowband (maserlike) at 38O $cm^{-1}$ becomes a group wave with a Gaussian distribution at fast air speeds. Such group waves can be utilized to amplify or quench the organisms semiochemical communication systems.

d. Mosquitoes

FIG. 7 is a spectrum of the well known $CO_2$ rotation line at 14.9 μm. This line can be stimulated to emit very strongly the vibration frequency of many species of mosquitoes, stable, and horse flies by modulating it at 210 Hz. Emission is stimulated by a slight nitrogen purge, a gentle breeze, and the 210 Hz modulated frequency. Addition of a trace of lactic acid causes slight amplification and more signals to emerge in this region. Many insects that attack animals are attracted to $CO_2$-lactic acid. The pumping radiation is near infrared in the 1 & 2 μm region.

5. Detection of Emissions of Frequency Emitter 5

The frequency and or harmonics emitted from frequency emitter 5 may be detected by a high resolution Fourier analysis interferometer spectrophometer (not shown). In a preferred embodiment, the maser-like emissions can be detected by the apparatus described in a U.S. patent application Ser. No. 08/047,486, filed Apr. 19, 1993, entitled "Photonic Ionic Cord Detector of Group Waves," by inventor Philip S. Callahan. The '486 patent application is hereby incorporated by reference in its entirety.

Figure 6:
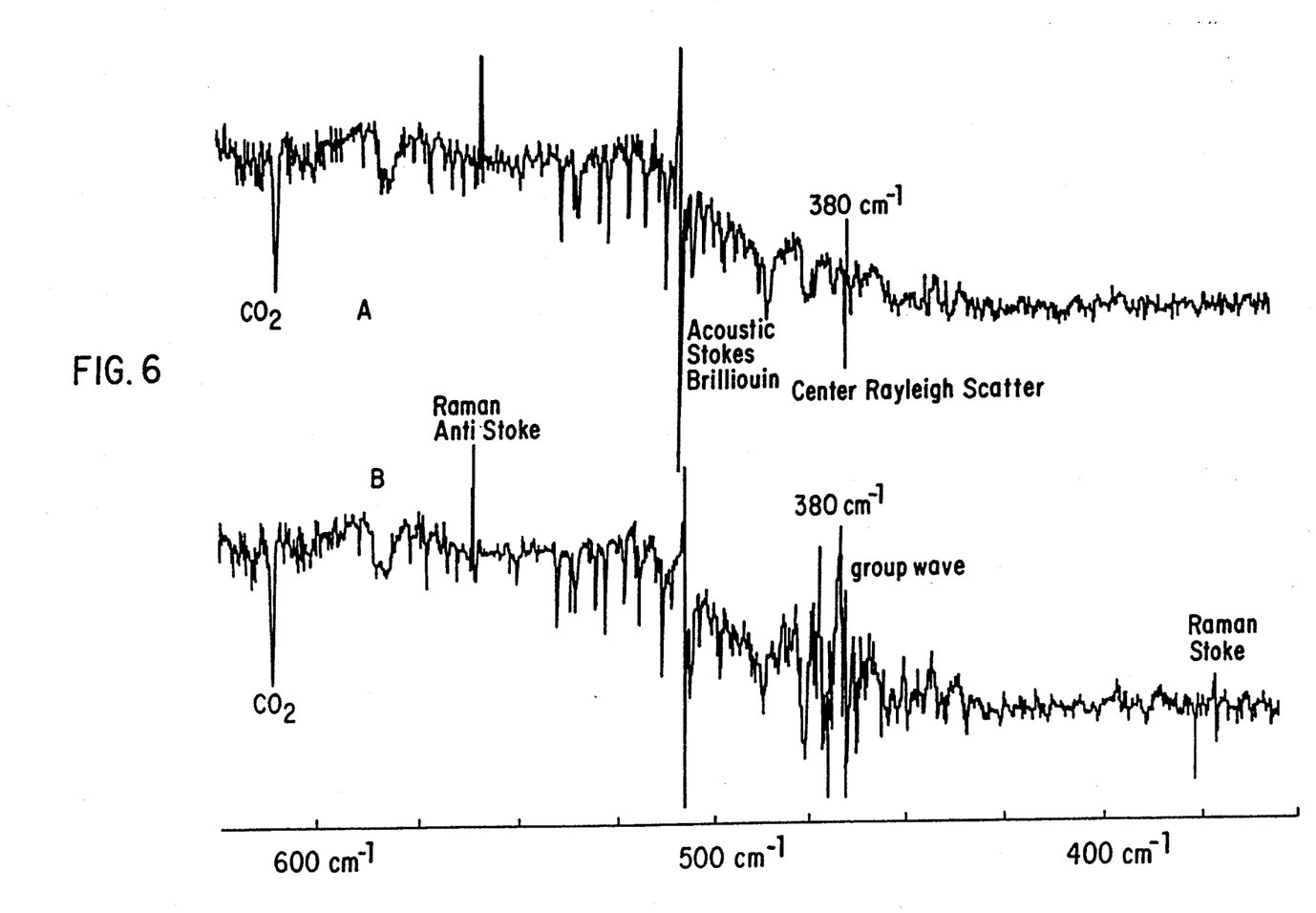
FIG. 6 illustrates spectrum of formaldehyde flowing across a 3600 Å Blacklight UV bulb.
Figure 7:
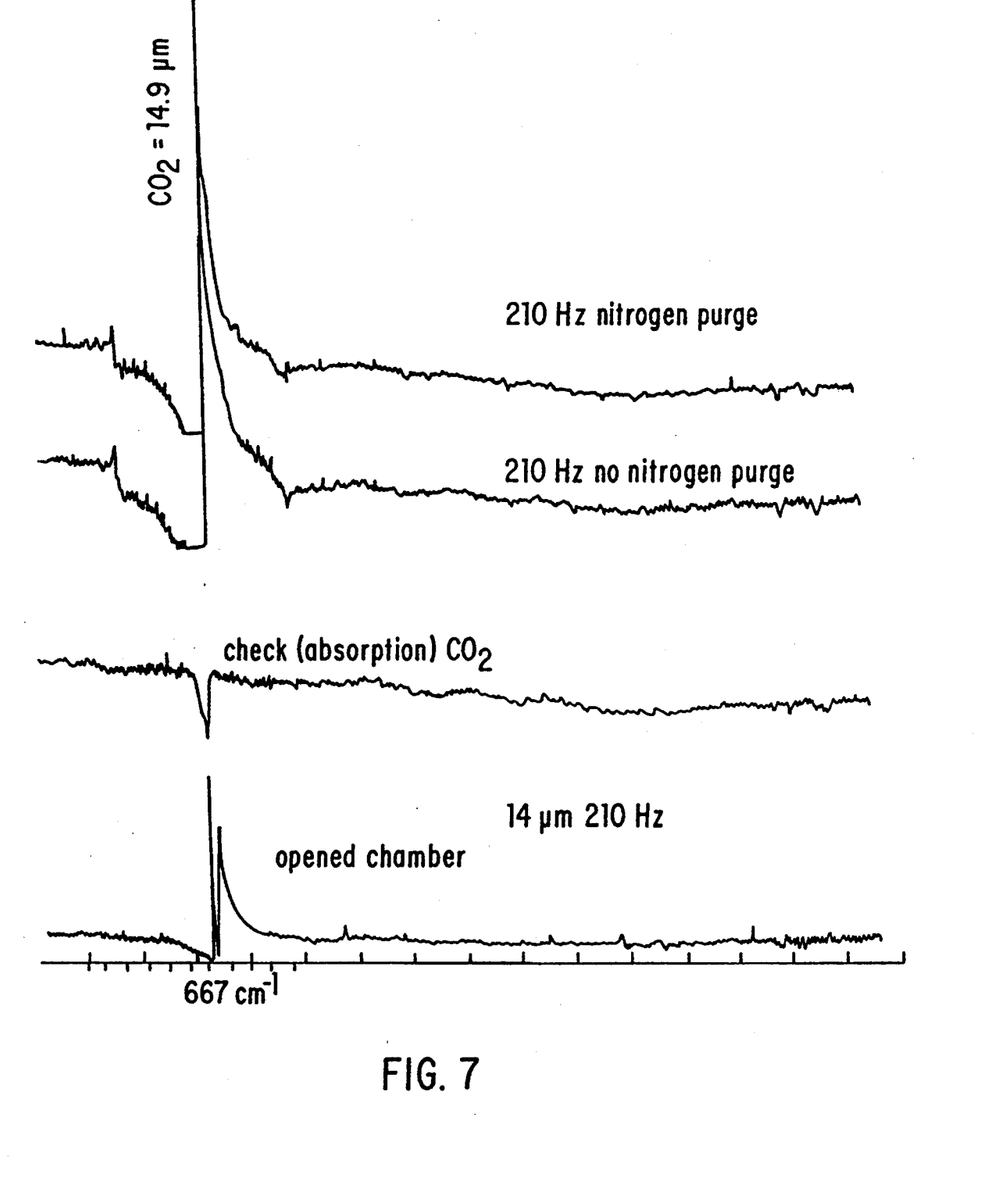
FIG. 7 is a spectrum of the well known $CO_2$ rotation line at 14.9 um.
Figure 8:
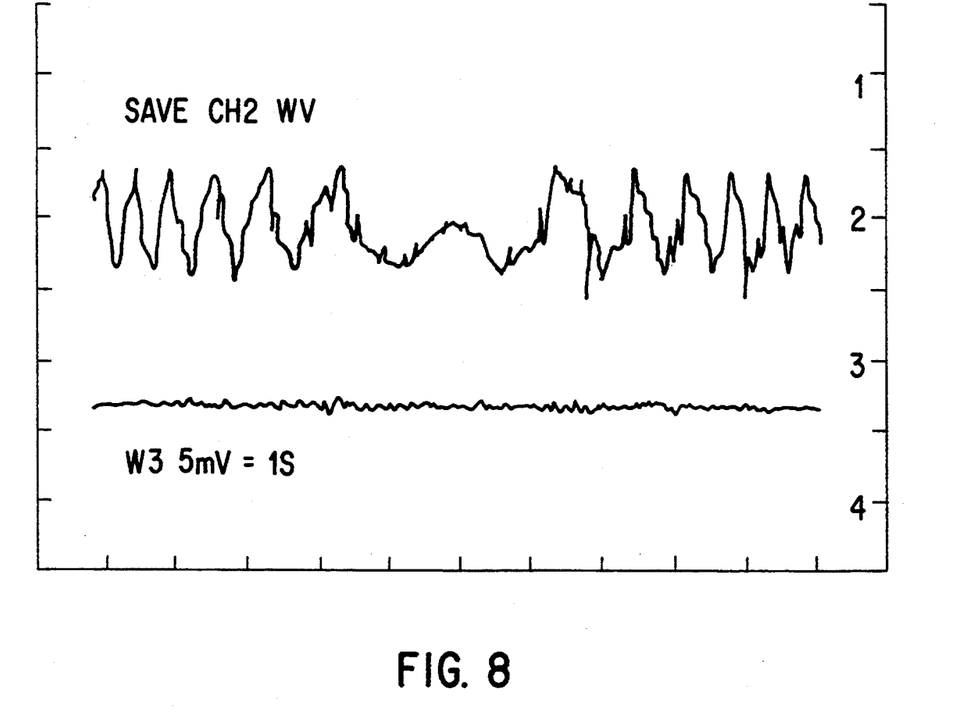
FIG. 8 is a spectrum of a group soliton atmospheric ELF wave.

FIG. 8 is an oscilloscope recording of a group soliton atmospheric ELF wave useful for modulating molecular scatter radiation and discovered by the Applicant on trees and human skin surfaces. Such group soliton waves are also observed as stimulated emission from insect semiochemicals attractants (e.g., FIG. 6), and are a part of the control configuration of such emissions for biological organisms. That is, the group soliton wave is a universal frequency that can be used to control insects. Although experimentation may indicate that other frequencies are more suited for a particular insect, the group soliton wave has been shown in experiments by Applicant to control a wide range of insects.

Conversely, frequency emitter 5 can be adapted to emit a gaussian distributed scatter group wave to quench (jam) an attractant or unwanted frequency.

6. Conclusion

A system has been disclosed for generating coherent or semi-coherent radiation frequencies to control or attract insects.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A coherent scatter and group soliton waveguide, surface enhanced emitter for control of an insect comprising:
   (a) a chamber having a first opening and a second opening formed within a first wall and a second wall of said chamber, respectively, wherein said chamber is filled with behavioral molecules;
   (b) a rod having a first end located within said chamber and a second end located outside of said chamber;
   (c) an oscillator connected to said second end of said rod, adapted to vibrate said rod at a predetermined frequency;
   (d) a plate having a scatter surface etched therein, said plate connected to said rod;
   (e) an air circulating pump connected to allow the behavioral molecules to circulate from said first opening over said scatter surface and to said second opening;
   (f) an adjustable grating connected to a third wall of said chamber;
   (g) a light source mounted within said chamber above said scatter surface; and
   (h) a window contained within a fourth wall of said chamber, wherein said window is substantially perpendicular to said scatter surface.

2. The emitter claim 1, wherein said chamber is constructed of plastic and is airtight.

3. The emitter of claim 1, wherein said window is constructed of a material that allows frequencies having wavelengths in one of the millimeter, infrared, visible, ultraviolet, or ultraviolet-Xray range to pass through said window.

4. The emitter of claim 2, wherein said scatter surface is adjustable in order to fine tune the coherent scatter and group soliton waveguide, surface enhanced emitter.

5. The emitter of claim 1, wherein the scatter surface is micro etched to match the unique scatter surfaces located one of the antenna, thorax, wings or legs of an insect.

6. The emitter of claim 1, wherein said grating has grooves etched therein, wherein the number of grooves etched in said grating matches the natural dimensions of the dielectric scatter antenna or sensilla of the insect being controlled.

7. The emitter of claim 1, wherein said grating is adapted to be adjusted to focus coherent or semi-coherent maser-like frequencies from the etched scatter surface through said window to the environment.

8. The emitter of claim 1, wherein said air circulating pump is adapted to adjust the flow rate of said behavioral molecules to match the natural air flow of airborne molecules that stimulate the insect.

9. The emitter of claim 1, further comprises a rotor motor that is adapted to rotate said chamber 360°.

10. The emitter of claim 1, wherein said oscillator can vibrate said rod from 1 to 800 Hz.

11. A method producing coherent or semi-coherent maser-like frequencies for the control of an insect, comprising the steps of:
   (1) filling an airtight chamber with behavioral molecules;
   (2) vibrating a scatter surface contained within said chamber at a natural frequency;
   (3) circulating said behavioral molecules at a natural rate over said scatter surface;
   (4) focusing the coherent or semi-coherent maser-like frequencies generated by performing steps (1) through (3) through a window formed within a wall of said chamber.

12. The method of claim 11, further comprising the step of rotating said chamber 360° around the vertical axis to thereby allow the maser-like frequencies to be spread over a large area.

13. The method of claim 11, wherein said scatter surface is adjusted to focus said maser-like frequencies through said window.

14. The method of claim 11, further comprising the step of micro etching said scatter surface to match the unique natural scatter surface located on one of the antenna, thorax, wings or legs of the insect.

15. The method of claim 11, further comprising the step of changing the temperature inside said chamber to thereby fine tune the maser-like frequencies emitted from said chamber.

16. The method of claim 11, further comprising the step of changing concentration of said behavioral molecules inside said chamber to thereby fine tune the maser-like frequencies emitted from said chamber.

17. The method of claim 11, further comprising the step of changing said circulation rate of said behavioral molecules to thereby fine tune the maser-like frequencies emitted from said chamber.

18. An apparatus that emits maser-like frequencies for the control of an insect, comprising:
   a scatter surface that is modeled after the natural surface of the insect;
   chamber means, having a window formed therein, for enclosing behavioral molecules, wherein said scatter surface is positioned within said chamber means;
   circulating means for circulating said behavioral molecules across said scatter surface within said chamber means;
   vibrating means for vibrating said scatter surface; and light means for directing low intensity pumping radiation across said scatter surface;

whereby maser-like frequencies generated by circulating said behavioral molecules across said scatter surface are emitted from said chamber means via said window.

19. The apparatus of claim 18, further comprising means for focusing said maser-like frequencies from said chamber means through said window.

20. The apparatus of claim 18, further comprising means for rotating said chamber means around the vertical axis.

21. The method of claim 11, further comprising the step of directing low intensity pumping radiation across said scatter surface.

22. The method of claim 21, further comprising the step of changing the wavelength of said low intensity pumping radiation to thereby fine tune the maser-like frequencies emitted from said chamber.

* * * * *